July 26, 1927.  
H. E. BLOOD  
1,636,800  
TRANSMISSION  
Filed Sept. 14, 1925  
3 Sheets-Sheet 1
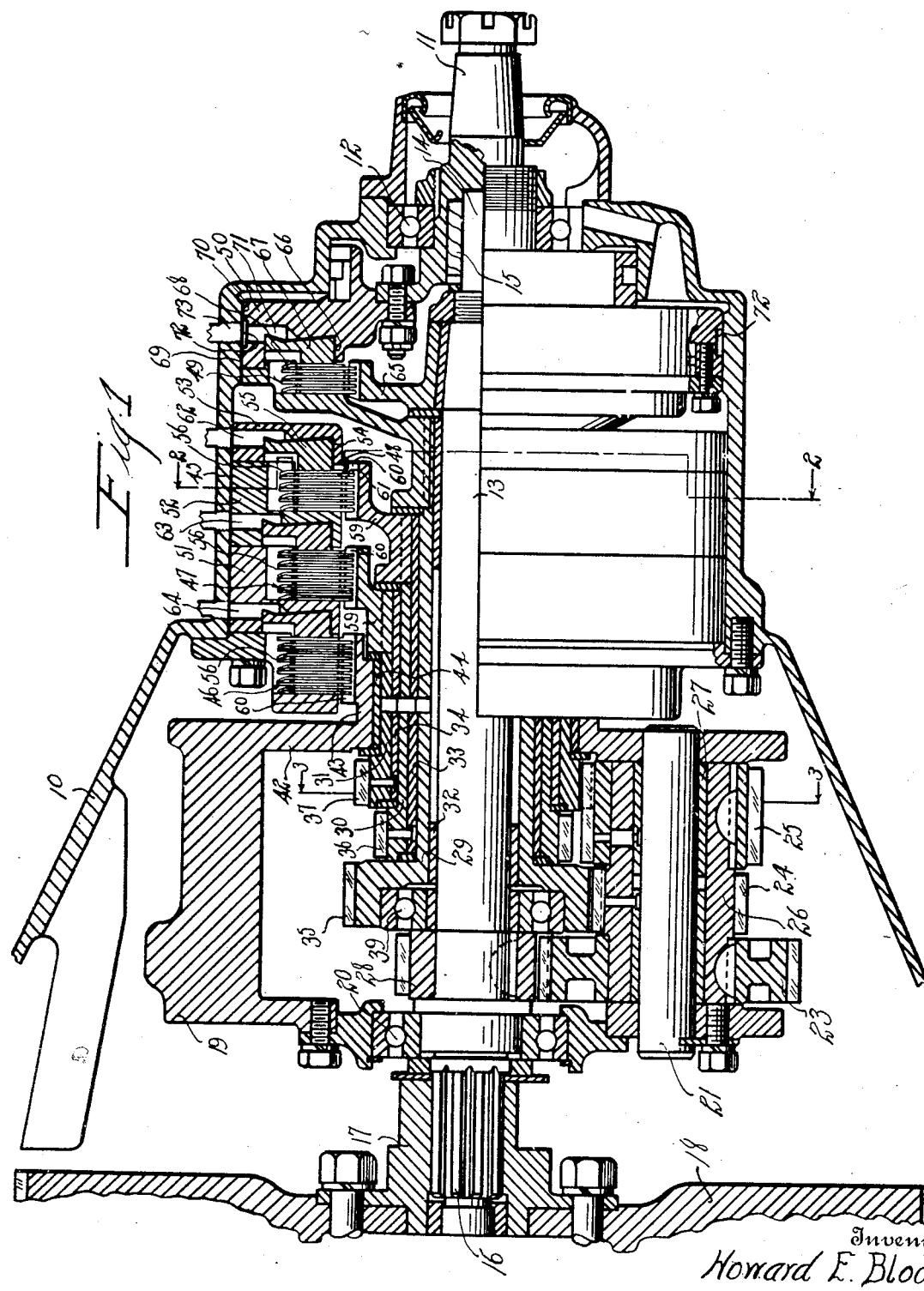
Inventor  
Howard E. Blood  
By Whittemore Hulbert Whittemore  
& Belknap  
Attorneys

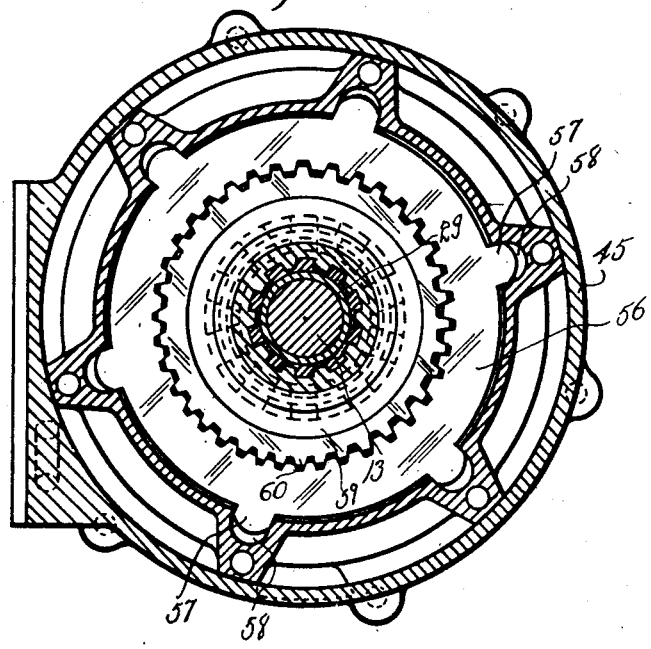
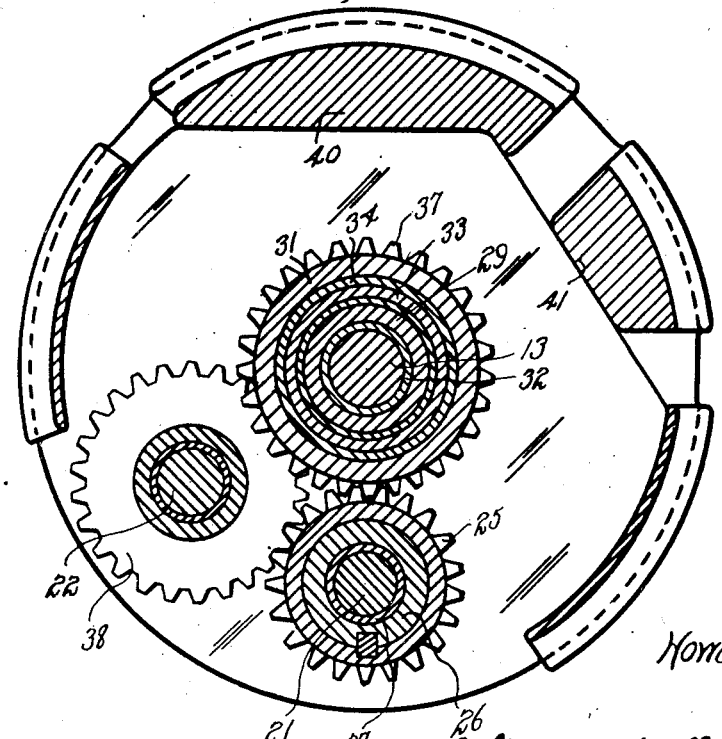

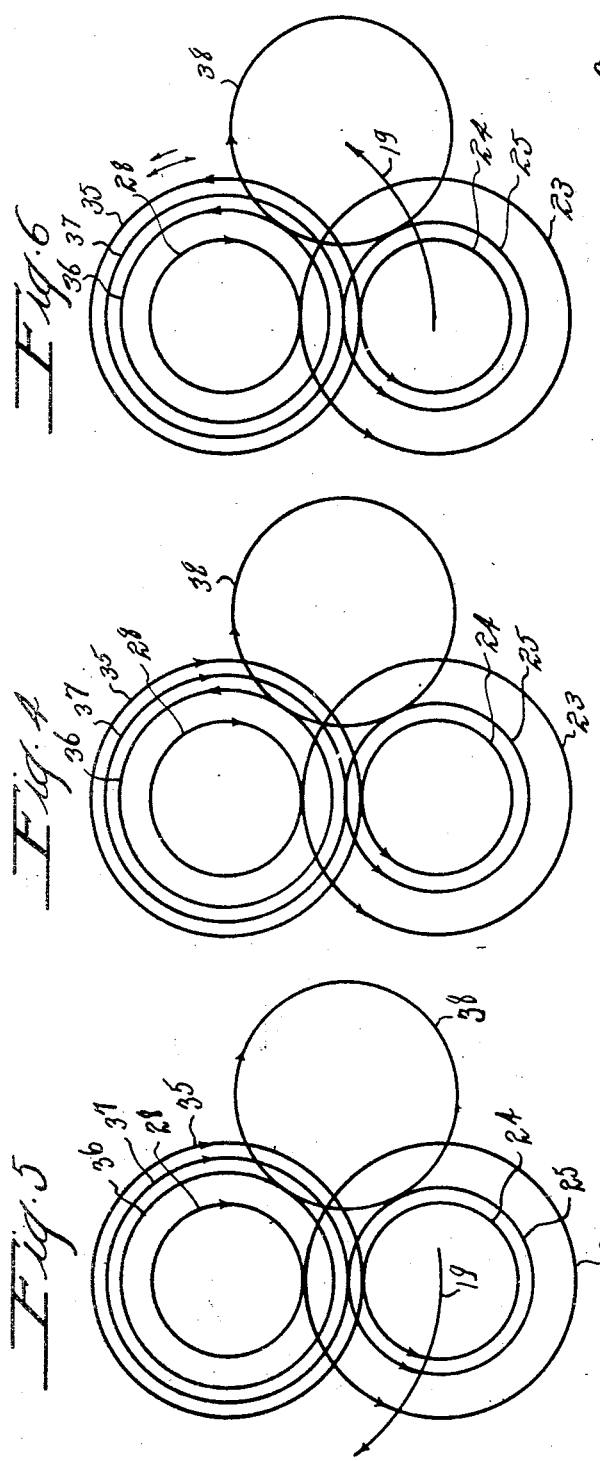

Patented July 26, 1927.

1,636,800

UNITED STATES PATENT OFFICE.

HOWARD E. BLOOD, OF DETROIT, MICHIGAN, ASSIGNOR TO DETROIT GEAR AND MACHINE COMPANY, OF DETROIT, MICHIGAN, A CORPORATION OF MICHIGAN.

TRANSMISSION.

Application filed September 14, 1925. Serial No. 56,348.

This invention relates to an improved planetary transmission adapted to be used in motor vehicles.

One of the objects of the invention is to provide an improved planetary construction having a plurality of forward speed ratio and a reverse.

Another object is the provision of a planetary transmission in which the various speeds are obtained by the selective operation of a plurality of hydraulically or pneumatically actuated clutches.

A further object is to provide a transmission having the driving and driven shafts continuously connected through a reduction gearing mounted in a rotatable housing and having also, means for compelling the rotation of said housing in different directions and at different speed ratios whereby a plurality of ratios between the driving and driven shafts is obtained.

Other objects reside in the combinations and arrangements of the parts as hereinafter more fully described and illustrated in the accompanying drawings, wherein:—

Figure 1 is a longitudinal section through the improved transmission;

Figure 2 is a transverse section on the line 2—2 of Figure 1;

Figure 3 is a transverse section through the planetary housing on the line 3—3 of Figure 1;

Figures 4, 5 and 6 are diagrams showing the direction of rotation of the gears at the various speeds;

Figure 7 illustrates diagrammatically a control system for the hydraulic clutches.

The construction illustrated in the drawings is of the unit power plant type, although I wish it understood that my invention is not limited to this type, but might be embodied equally well in a separate transmission unit. 10 is the transmission case open at its forward end and adapted to be attached to the engine casing (not shown). 11 is the driven shaft journaled in the rear end of the transmission case by means of the roller bearing 12. 13 is the driving shaft axially aligned with the driven shaft and having a reduced portion 14 journaled in the driven shaft by roller bearing 15. The forward end of the driving shaft 13 is provided with splines 16 adapted to engage the hub 17 of the engine fly wheel 18. 19 is the planetary housing journaled at its forward end on the driving shaft 13 by the ball bearing 20. The planetary housing is provided with two eccentric shafts 21 and 22, the former being termed the countershaft and the latter the idler shaft. Rotatably mounted on the countershaft 21 are three gears, the countershaft gear 23, the countershaft pinion 24 and the planet gear 25. These gears are mounted to rotate together and as shown, the gear 24 is formed on a sleeve 26 to which the gears 23 and 25 are keyed and the sleeve is journaled upon the countershaft 21 by means of the bushing 27.

The driving shaft has a driving pinion 28 keyed thereto and arranged to mesh with the countershaft gear 23. Concentrically mounted on the draving shaft are a plurality of sleeves 29, 30 and 31, these sleeves being separated from each other by the bushings 32, 33 and 34. The driven sleeve 29 is provided at its forward end with a driven gear 35, the sleeve 30 provided with the intermediate sun gear 36 and sleeve 31 with the reverse sun gear 37. The driven gear 35 meshes continuously with the countershaft pinion 24, the reverse sun gear 37 meshes with the planet gear 25 and the intermediate sun gear 36 meshes with an idler gear 38, which in turn meshes with the planet gear 25. 39 is a ball bearing interposed between the driving shaft 13 and the driven gear 35.

The planetary housing 19 is provided with counterweights 40 and 41 arranged to counterbalance the parts mounted upon the countershaft and idler shaft. The housing is also provided with an inwardly projecting rear flange 42' having a laterally projecting sleeve 43 which is journaled upon the sleeve 31 by means of a bushing 44.

The transmission case has a cylindrical rear portion 45 in which is arranged a series of annular clutches longitudinally spaced from each other. The low speed clutch 46, reverse clutch 47 and intermediate speed clutch 48 are arranged to lock the planetary housing 19, the reverse sun gear 37, the intermediate sun gear 36 respectively to the transmission case, while a fourth clutch 49 is adapted to couple the driven gear 35 to the driving shaft 13. The driven gear 35 is at all times connected to the driven shaft 11 through the high speed clutch housing 50.

With the construction as thus far described, the direct drive is obtained by operating the high speed clutch 49 thereby locking the driving shaft 13 to the housing 50 and compelling all of the parts to rotate as a unit thereby causing the planetary assembly to rotate as a unit with the fly wheel 18 and the driven shaft 11. The low speed is obtained by releasing the high speed clutch and engaging the low speed clutch 46, which fixes the planetary housing 19 to the transmission case 10. With this arrangement the drive is through the driving pinion 28, the countershaft gear 23, the countershaft pinion 24, driven gear 35, driven sleeve 29, high speed clutch housing 50 and driven shaft 11. The driven shaft, therefore, rotates at a reduced speed depending upon the ratios of the gear teeth in the gear train. The intermediate speed is obtained by releasing the low speed clutch and engaging the intermediate speed clutch 48, the latter locking the intermediate sun gear 36 to the transmission case 10. The drive is now transmitted through driving pinion 28, countershaft gear 23, planet gear 25 and idler gear 38 and since the latter meshes with the intermediate sun gear 36 which is held stationary the planetary housing 19 is caused to rotate in the same direction as the engine. This rotation of the planetary housing is transmitted to the driven shaft 11 through the countershaft pinion 24, driven gear 35, driven sleeve 29 and housing 50. At the same time, a motion is imparted to the driven shaft by reason of the rotation of the countershaft pinion 24 about its axis. Therefore, the speed at which the driven shaft 11 is rotated relative to the driving shaft is the sum of the movements imparted by the rotation of the countershaft pinion 24 and the rotation of the planetary housing 19.

The reverse speed is obtained by engaging the reverse speed clutch 47, thereby locking the reverse speed sun gear 37 to the transmission case. With this arrangement the planetary housing 19 is caused to rotate in the opposite direction from the driving shaft because the planet gear 25 directly meshes with the stationary sun gear 37. The reverse rotation of the planetary housing is transmitted to the driven shaft because of the engagement of countershaft pinion 24 with the driven gear 35, this tending to rotate the driven shaft 11 oppositely to the driving shaft. At the same time the rotation of the countershaft pinion 24 about its axis is tending to rotate the driven shaft in the same direction as the driving shaft. The resulting motion of the driven shaft 11 will therefore, depend upon the ratios of the gears and if the reverse rotation due to the planetary housing is greater than the forward rotation due to the axial rotation of the countershaft pinion 24, the driven shaft 11 will rotate oppositely to the driving shaft 13.

Figures 4, 5 and 6 diagrammatically show the direction of rotation of the various gears. Figure 4 illustrates low speed conditions where the planetary housing is held stationary and the driving pinion 28 and driven gear 35 both rotate clockwise. The sun gears 36 and 37 rotate in opposite directions but have no function in transmitting the torque.

Figure 5 represents an intermediate speed where the sun gear 36 is held stationary. This causes the housing 19 to move clockwise thus imparting a clockwise increment to the driven gear 35. At the same time, the countershaft pinion 24 is rotating counterclockwise about its axis thereby imparting an additional clockwise increment to the driven gear 35. These two increments being in the same direction result in a resultant motion of the gear 35 in a clockwise direction.

Figure 6 represents the reverse speed conditions where the sun gear 37 is held stationary. This causes a motion of the planetary housing 19 in a counter-clockwise direction, thereby imparting a counter-clockwise increment to the driven gear 35. At the same time, the countershaft pinion 24 is being rotated about its axis in a counter-clockwise direction thus imparting an increment to the gear 35 in a clockwise direction but at a slower rate than the increment due to the housing 19. The resulting motion of the driven gear 35 is therefore counter-clockwise and the driven shaft is therefore reversely rotated.

I will now give a more detailed description of the various clutches above referred to. The cylindrical portion 45 of the transmission case has a plurality of longitudinally spaced heads projecting radially inward therefrom and designated by the numerals 51, 52 and 53. Each of the heads contains an annular recess or cylinder 54 in which is arranged an annular piston 55. A series of clutch discs 56 are arranged within the annular pocket formed between the adjacent heads and are secured by means of ears 57 entering slots 58 in the head. These discs are held in spaced relation by the inclination of the alternate ears in each disc. Hubs 59 are keyed to each of the sleeves 30, 31 and 43 and have the peripherally arranged teeth 60 for engaging the rotatable clutch discs 61, the latter being disposed between the adjacent spaced stationary discs 56. The rotatable and stationary discs are normally disengaged from each other due to the resiliency of the inclined ears 57, but are adapted to be engaged by movement of the piston 55 in the cylinder 54. For introducing the fluid into the cylinders there are the radial holes 62, 63 and 64 arranged in the respective heads and connected to suitable control valves for the hydraulic pressure.

The arrangement of clutch 49 is similar to those above described except that both sets of clutch discs are rotatable, one set being secured to the hub 65 on the driving shaft 13 and the other set being secured to the housing 50, the latter is provided with an annular recess or cylinder 66 having an annular piston 67 slidable therein and engaging the plates 68 secured to the housing 50. Since the housing 50 is at all times rotatable with the driven shaft 11 and driven sleeve 29, means must be provided for introducing the fluid into a rotating part in order to actuate the piston 67. As illustrated in Figure 1, this is accomplished by providing a bearing surface 69 in the cylindrical housing 45 which has a running fit with the outer cylindrical surface 70 of the rotatable housing 50. A radial hole 71 in the housing 50 communicates with the cylinder 66 and extends outward to an annular peripheral groove 72, the latter registering at all times with a radial bore 73 in the cylindrical housing 45. In this manner a seal is maintained between the rotatable housing 50 and the transmission case sufficient to maintain the necessary pressure to operate the piston 67 and clutch 49. It is not necessary that the seal be entirely leak-proof, since the transmission case is filled with oil for lubricating the mechanism and the clutches all rotate in the oil so that any fluid escaping through the joint will be retained within the transmission case.

In order to operate the various clutches selectively, any suitable hydraulic controlling means may be employed and in Figure 7 I have illustrated diagrammatically one arragement which may be used satisfactorily. 74 is an oil reservoir from which the fluid is withdrawn through intake pipe 75 by means of a gear pump 76 driven by the engine. The outlet conduit 77 leads to a suitable relief valve 78 whereby excess oil is allowed to escape through conduit 79 to the return conduit 80 leading to the reservoir 74. From the relief valve the fluid is delivered through conduit 81 to a master control valve 82 which is preferably operated by the clutch pedal of the motor vehicle. This valve either allows the pressure to be communicated to the main conduit 83 or in another position of adjustment cuts off the pressure from the line and opens the escape port 84 communicating with the return conduit 80. 85, 86, 87 and 88 are valves adapted to control the respective clutches of the transmission, each being connected to the main pressure line 83 and to the return conduit 80. In the normal position of each of the valves the fluid connections from the clutches communicate with the return conduit 80, but by actuating any valve the escape is cut off and the fluid connection to the clutch is connected with the pressure line 83 thereby operating the corresponding clutch.

While I have illustrated diagrammatically in Figure 7 a control for the various clutches of the transmission, it is to be understood that other controlling arrangements might be used with my improved transmission and I do not regard my invention as being limited to the particular controlling system described.

What I claim as my invention is:—

1. In a transmission the combination with a transmission case, a driving gear, a driven gear, a planetary housing and a sun gear all journaled concentrically and adapted for independent rotation, of a plurality of planet gears journaled eccentrically in said housing and adapted to rotate together at all times, said planet gears meshing with said driving gear, driven gear and sun gear respectively, a series of concentric sleeves respectively connected to said driving gear, driven gear, sun gear and housing, means for clutching said driving gear sleeve to said driven gear sleeve, means for clutching each of the other sleeves to said transmission case, and means for alternatively engaging said clutching means whereby only one of said clutching means is engaged, at all times.

2. In a transmission, the combination of a transmission case, a driving shaft, a driven shaft axially aligned therewith, a clutch plate secured to said driving shaft, a sleeve journaled on said driving shaft having a driven gear at one end thereof, a clutch housing surrounding said clutch plate and connected to said sleeve and to said driven shaft, a second sleeve journaled on said first-mentioned sleeve having a sun gear at one end thereof, and a clutch plate at the opposite end, a driving gear on said driving shaft, a planetary housing surrounding said gears and journaled concentrically thereto, a clutch disc connected to said planetary housing, a countershaft in said planetary housing, planet gears journaled on said countershaft meshing respectively with said driving gear, driven gear and sun gear, means for engaging the clutch disc on said driving shaft with said clutch housing, and a series of clutches for alternatively clutching the remaining clutch discs to said transmission case.

3. In a transmission, the combination with a driving gear, a driven gear and a planetary housing all journaled concentrically and adapted for independent rotation, of a countershaft mounted eccentrically in said housing, gearing on said countershaft continuously meshing with said driving and driven gears and adapted to drive the latter from the former at a reduced ratio when said housing is stationary, means for compelling rotation of said housing at a plurality of different speed ratios with respect to the driving gear whereby the rotation of said driven gear is modified by the orbital rotation of said countershaft gearing, a plurality of hubs secured to said concentrically journaled members, a plurality of heads surrounding said hubs, clutch discs on said hubs, cooperating clutch discs on said heads, and fluid actuated pistons carried by said heads, for engaging said clutch discs.

4. In a planetary transmission, the combination with driving and driven gears, a planetary housing and a plurality of sun gears all journaled concentrically, of a countershaft in said planetary housing, gears on said countershaft engaging said driving, driven and sun gears respectively, a plurality of longitudinally spaced hubs respectively secured to said concentrically journalled members, stationary heads surrounding said hubs having annular cylindrical recesses therein, annular pistons slidable in said recesses, clutches between the respective hubs and said heads adapted to be actuated by said pistons, and connections to said cylinders for operating said pistons by hydraulic pressure.

5. In a transmission, the combination with a driving shaft, having a gear at one end, and a driving hub at the opposite end, a sleeve surrounding said shaft having a driven gear at one end and a driven hub at the opposite end, a housing secured to said driven hub and surrounding said driving hub, a cylinder formed in said housing, a piston in said cylinder, a clutch connecting said housing to said driving hub adapted to be operated by said piston, a transmission case having a cylindrical bearing engaging said housing, a fluid conduit connected to said housing and a passageway in said housing registering with said fluid conduit and communicating with said cylinder.

6. In a transmission, the combination with a plurality of concentrically journaled gears, a plurality of sleeves connected to the respective gears, a housing surrounding said sleeves, inwardly projecting heads on said housing having annular cylindrical recesses therein, pistons engaging said annular recesses, clutches arranged between said heads, each having one set of plates connected to said heads and another set of plates intermediate said first set of plates and hubs secured to said sleeves for supporting the second mentioned sets of plates.

7. In a transmission, the combination of a transmission case, a driving shaft, a driven shaft axially aligned therewith, a sleeve journalled on said driving shaft and secured to said driven shaft to rotate therewith and having a driven gear at one end thereof, a driving gear on said driving shaft adjacent said driven gear, a second sleeve journalled on said first-mentioned sleeve and having a sun gear at one end thereof adjacent said driving and driven gears and arranged concentric therewith, a planetary housing surrounding said gears and journalled concentrically thereto and having a sleeve journalled on said sun gear sleeve a plurality of planet gears journalled eccentrically in said housing and adapted to rotate together at all times, said planet gears meshing with said driving gear, driven gear and sun gear respectively, means for clutching said driven sleeve to said driving shaft, means for clutching each of the other sleeves to said transmission case, and means for alternately engaging said clutching means whereby only one of said clutching means is engaged at all times.

In testimony whereof I affix my signature.

HOWARD E. BLOOD.